(12) United States Patent
Pagot et al.

(10) Patent No.: US 6,935,113 B2
(45) Date of Patent: Aug. 30, 2005

(54) MASTER CYLINDER PISTON AND DEVICE FOR MOUNTING A CHECK VALVE THEREIN

(75) Inventors: Henri Pagot, Villetaneuse (FR); Jean-Claude Hennebelle, Hamel (FR); Vincenzo Manzo, Bari (IT)

(73) Assignee: Robert Bosch GmbH, Stuttgart (DE)

( * ) Notice: Subject to any disclaimer, the term of this patent is extended or adjusted under 35 U.S.C. 154(b) by 245 days.

(21) Appl. No.: 10/433,628

(22) PCT Filed: Dec. 3, 2001

(86) PCT No.: PCT/FR01/03807

§ 371 (c)(1),
(2), (4) Date: Jun. 3, 2003

(87) PCT Pub. No.: WO02/46010

PCT Pub. Date: Jun. 13, 2002

(65) Prior Publication Data

US 2004/0237769 A1 Dec. 2, 2004

(30) Foreign Application Priority Data

Dec. 6, 2000 (FR) .............................. 00 15848

(51) Int. Cl.$^7$ ................................. B60T 11/28
(52) U.S. Cl. ........................... 60/589; 60/562
(58) Field of Search ...................... 60/562, 586, 588, 60/589; 91/422

(56) References Cited

U.S. PATENT DOCUMENTS

| | | | | | |
|---|---|---|---|---|---|
| 5,179,834 | A | * | 1/1993 | Rauschenbach | ............ 60/589 |
| 5,207,062 | A | * | 5/1993 | Wilson et al. | ............ 60/562 |
| 5,417,067 | A | * | 5/1995 | Nevitt | ............ 60/588 |
| 6,065,292 | A | * | 5/2000 | Unterberg | ............ 60/589 |
| 6,203,022 | B1 | * | 3/2001 | Struschka et al. | ............ 60/589 |

* cited by examiner

Primary Examiner—Thomas E. Lazo
(74) Attorney, Agent, or Firm—Leo H. McCormick, Jr.; Warren Comstock

(57) ABSTRACT

A master cylinder piston for use in a motor vehicle having a flap (22) that is biased towards a position to shut off a pressure-fluid passage (24) by a return spring (28) resting on a cage (30). A flange (38) on a cage (30)for the Spring (28) is located in an annular groove (44) provided in the housing (20) for the flap (22) when the cage (30) bears axially on an inner shoulder (64) of the housing (20).

11 Claims, 2 Drawing Sheets

MASTER CYLINDER PISTON AND DEVICE FOR MOUNTING A CHECK VALVE THEREIN

This invention relates to a master cylinder piston of a braking circuit, more particularly for a motor vehicle, as well as to a jig for the fitting of a flap into said piston.

BACKGROUND OF THE INVENTION

In a master cylinder, more particularly of the tandem type, each of the primary and secondary pistons is fitted with a moving shutter, or flap, for the opening and closing of a pressure-fluid passage provided in the piston, as a function of the strokes of the piston inside the master cylinder.

Such fluid passage opens axially into a housing formed at one end of the piston and accommodating the flap, which comprises a rod, guided within the fluid passage, and a head situated outside the passage and biased by a return spring towards the fluid passage outlet so as to close it in a tight manner.

Such return spring is a compression spring arranged between the flap head and bearing means, added to the piston.

It has already been suggested that these bearing means be constituted by a metal cage resiliently snapped in the flap housing. For this purpose, the cage comprises resiliently-deformable lugs, situated at its periphery, facing radially outwards and intended to enter and get latched in an annular groove provided in the cylindrical wall of the flap housing. In the course of the assembling process, such lugs are resiliently brought closer to the axis, as the cage is inserted in the flap housing and they rub against the cylindrical wall of the housing till the cage assumes an axial position inside the housing, in which the lugs engage the above-mentioned annular groove in a snapping manner.

The rubbing motions of the steel cage lugs against the cylindrical wall of the housing provided in the piston, made of aluminium or of a light alloy, are likely to scratch the cylindrical wall and tear away metal particles or chips, which may settle under the flap head or on the upper lip of a seal cup, or be the cause of scratches during the piston travel and consequently give rise to tightness failures in the master cylinder, actually a major drawback which it is essential to cure.

Besides, such cage should neither interfere with the brake-fluid flow nor restrict its flow rate.

SUMMARY OF THE INVENTION

Therefore, it is the main object of the present invention to provide a simple, efficient and inexpensive solution to the above-mentioned problem, in that any potential scratch or tightness failure of the master cylinder is prevented, which would result from the mounting of said cage on the piston of the master cylinder.

With this object in view, the present invention provides a master cylinder piston, more particularly for a motor vehicle, comprising at one end a substantially cylindrical housing accommodating a flap and a return spring arranged between the flap and a cage, added to the piston, characterised in that said cage is crimped inside said housing.

Crimping actually means a plastic deformation of part of the cage, which may be performed when the cage is in the desired axial position inside the housing, which precludes any risk of tearing away metal particles or chips, likely to give rise to scratches and tightness failures in the master cylinder.

In accordance with another feature of the invention, the crimping process is carried out using retaining, means, which are formed on the cage and accommodated, under a plastic deformation effect, in an annular groove provided in said housing.

According to a first embodiment of the present invention, the retaining means of the cage comprise a substantially cylindrical flange extending round the cage in the direction of the open end of the housing.

In another embodiment of this invention, such retaining means comprise lugs, extending substantially parallel to the axis of the cage around the latter in the direction of the open end of the housing.

Advantageously, such lugs are formed either by partial cuts or cutouts made in a substantially cylindrical or truncated-cone shaped wall of the cage.

Preferably, the retaining means are formed at one end of the cage and joined up with it by an annular flange extending radially inwards and comprising means for an applying to supporting means, formed inside the flap housing.

It results in that the cage may be set automatically in its crimping position inside the housing.

At its end facing away from said retaining means, the cage comprises another annular flange directed radially inwards and constituting bearing means for the return spring of the flap.

In an advantageous manner, the cage according to the invention is manufactured using a stamping process, in a simple and inexpensive way.

The invention also provides a jig for the fitting of a flap into a master cylinder piston, more particularly for a motor vehicle, such piston comprising, at one end, a substantially cylindrical housing accommodating a flap and a return spring arranged between the flap and a cages added to the piston and fastened using retaining means received within an annular groove made in the cylindrical wall of the housing, said device being characterised in that:

in an initial free state, the cage has an outer diameter which is smaller than the inner diameter of the housing;
   the housing includes means for the axial support of the cage in a position in which its retaining means are radially in line with said annular groove;
   the jig comprises means for the support and application of the cage onto the supporting means of the housing, and means for a radially-outward deformation of said retaining means, so as to introduce them into the annular groove provided in the housing.

In an advantageous manner, the means for the support and application of the cage onto the supporting means of the housing comprise a central push rod, fitted inside a tubular member, a bevelled end of which constitutes said radial-deformation means.

Preferably, the central push rod is guided for an axial sliding motion within said tubular member, and biased by a return spring in a direction which corresponds to the applying of the cage onto the supporting means, formed in the housing.

According to this invention, one only has to proceed to the axial alignment of the jig with the master cylinder piston, and then move, in an axial translation motion, the jig towards the piston or vice versa, so as to insert the cage in the flap housing, position it axially inside said housing through its retaining means radially in line with the annular groove, provided in the housing for their accommodation, and move the jig farther on towards the piston for a plastic deformation of the retaining means of the cage and their radial introduction into the annular groove provided in the housing.

Afterwards, a reverse axial translation motion causes the piston to separate from the jig, whereas the cage is retained within the flap housing.

Other features, advantages and details of the present invention will be apparent from the following detailed description, by way of example and by no means as a limitation, when taken in conjunction with the accompanying drawings, in which:

DETAILED DESCRIPTION OF THE INVENTION

Figure 1:
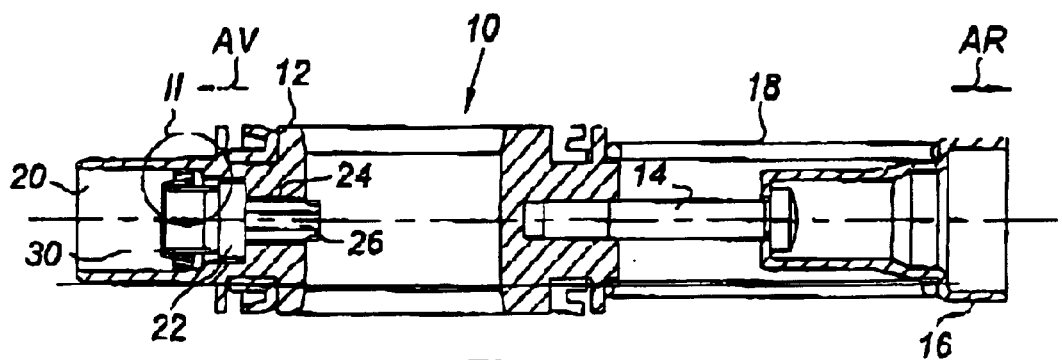
FIG. 1 is a schematic axial sectional view, showing a master cylinder piston according to this invention.

As a rule, in the drawings, the forward direction is indicated by arrow AV while arrow AR shows the rear direction.

FIG. 1 is a schematic illustration of an embodiment of a secondary piston 10 of a tandem master cylinder of a braking circuit for a motor vehicle, the piston 10 comprising a body 12, which is connected by means of an adjusting screw 14 to a spring stop 16, biased by a spring 18, arranged between the stop 16 and an end of the secondary piston body 12, such spring stop 16 being intended for a cooperation with a primary piston (not shown) of the master cylinder.

At the end facing away from the spring stop 16, the secondary piston exhibits a tubular axial end 20, which defines a substantially cylindrical housing for the accommodation of a flap 22, opening and closing an axial passage 24, made in a transverse wall of the body 12. The flap 22 includes an axial rod 26, inserted in the passage 24, and it is connected to a return spring 28, arranged between the head of the flap 22 and a cage 30, inserted inside the housing 20.

In the position illustrated in FIG. 1, the head of the flap 22 is resiliently pushed by the return spring 28 to bear on the outlet of the passage 24 in the housing 20, for a tight shut-off of said passage.

The cage 30 is a metal part, for instance a stamped steel one, and it comprises a truncated-cone shaped wall 32 widening rearwards, and the front end of which is connected to an annular flange 34 extending radially inwards, whereas the rear end of the truncated-cone shaped wall 32 is joined up with an annular flange 36 extending radially outwards, itself linked up with a cylindrical flange 38 which extends in the forward direction about the truncated-cone shaped wall 32 and spaced apart from it.

Figure 2:
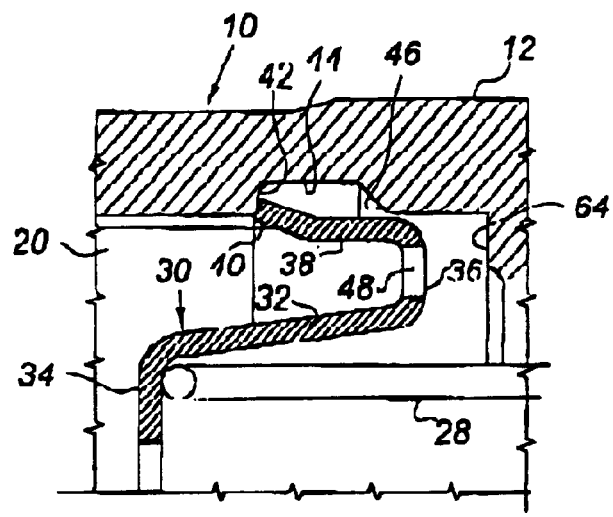
FIG. 2 is a schematic view on a larger scale of the detail within circle II of FIG. 1.

In the crimping position of the cage 30, as shown in FIGS. 1 and 2, the front end 40 of the cylindrical flange 38 is deformed radially outwards and it extends slantwise so as to abut against the front edge 42 of an annular groove 44, provided in the inner surface of the wall of the housing 20, such groove having a rear edge 46 extending slantwise rearwards. The inner diameter of the cylindrical wall of the housing 20 is slightly greater than the outer diameter of the cylindrical flange 38 in the unstrained free condition. In said position, the cage 30 may be moved axially inside the housing 20 on a distance which corresponds to the axial play of the end 40 of the flange 38 within the groove 44, with the result that openings 48, made at regular intervals in the annular flange 36, may be kept clear of the end part of the housing 20, so as to facilitate the pressure-fluid flow through the passage 24 when the flap 22 is open, such pressure fluid also flowing through the central opening, defined by the annular flange 34 of the cage 30.

Figure 3:
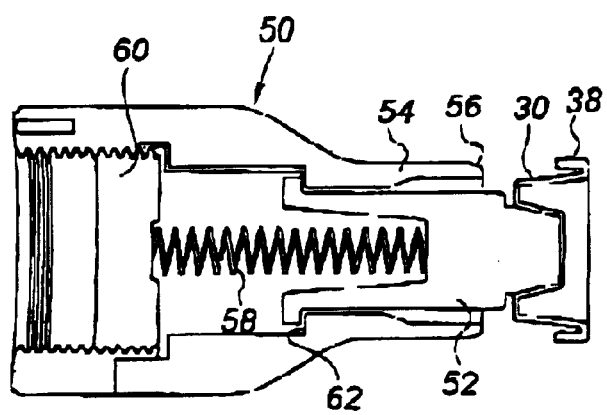
FIG. 3 is a schematic axial sectional view of a jig according to this invention.

FIG. 3 shows an embodiment of a jig for the fitting of the cage 30, in a schematic manner.

Such jig 50 comprises a central push rod 52, slidably fitted inside a tubular member 54, the rear end 56 of which is bevelled outwards and constitutes the means for the plastic deformation of the end 40 of the cylindrical flange 38 of the cage 30.

A compression spring 58 is arranged inside the tubular member 54, between the push rod 52 and a front stop 60, the axial position of which can be adjusted when it is screwed in the tubular member 54, and so the push rod 52 is permanently biased rearwards by the spring 58 in order to rest against an inner shoulder 62 of the tubular member 54. The rear end of the push rod 52 comprises support means for the cage 30.

Figure 4:
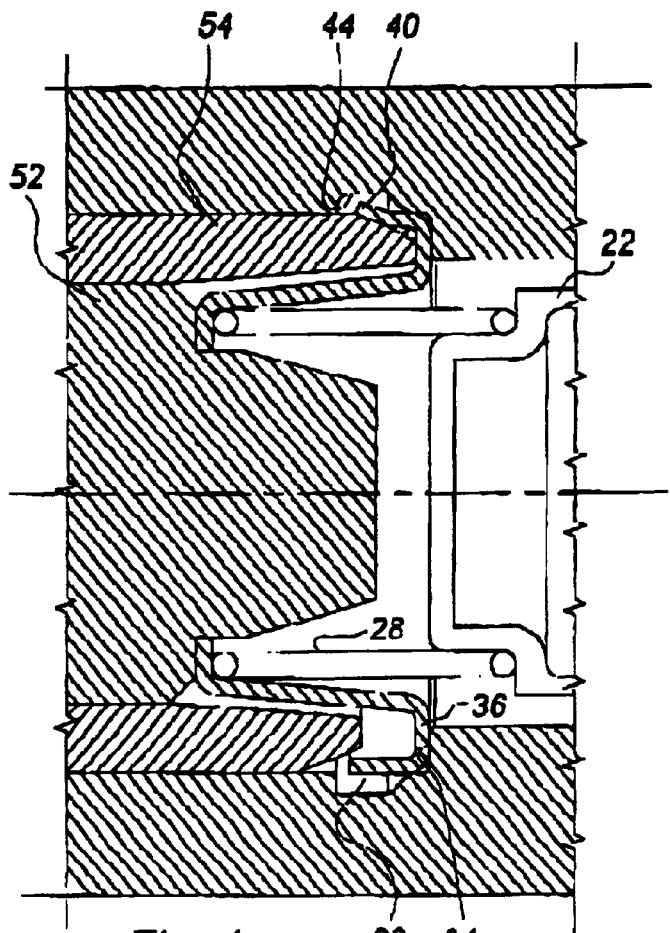
FIG. 4 is a schematic partial axial sectional view, on a larger scale, showing the fitting of the cage into the flap housing of a piston according to this invention.

The mode of operation of said jig is represented in FIG. 4, the lower part of which shows the cage 30 before it is crimped, while the upper part shows the cage 30 as it is being crimped.

Initially, the flap 22 is introduced by its rod 26 into the passage 24 and the spring 28 is fitted on the head of the flap 22.

The jig according to FIG. 3 is axially aligned with the secondary piston 10 in such a way that the cage 30, carried by the end part of the push rod 52, faces the open end of the housing 20 at the front end of the piston 10. Then the device is subjected to an axial translation motion till it reaches the position shown in the lower part of FIG. 4, in which the spring 28 is compressed between the head of the flap 22 and the annular flange 34 of the cage 30, the latter resting at its annular flange 36 on an inner shoulder 64 of the housing 20. For the time being, the front end of the cylindrical flange 38 of the cage 30 lies substantially at the level of the middle part of the annular groove 44 provided in the housing 20.

Thereafter, the tubular member 54 of the jig is moved farther on rearwards so that its bevelled end 56 may enter the cylindrical flange 38, with the result that it deforms the end 40 of such flange radially outwards within the annular groove 44, and that it axially abuts against the annular flange 36 of the cage 30, the latter flange abutting against the inner shoulder 64 of the housing 20, as shown in the upper part of FIG. 4.

In such a position, the outward deformation of the end 40 of the cylindrical flange 38 of the cage is a permanent set. In a preferred manner, such a process is carried out without the end 40 of the flange 38 bearing on the root of the groove 44.

Next, the jig 50 is axially moved in the forward direction so as to be extracted from the housing 20. Under the force exerted by the spring 28, the cage 30 follows that translation motion till the end 40 of its cylindrical flange 38 comes to rest on the front edge of the annular groove 44, in the position illustrated in FIG. 2. This being so, the flap 22 is kept in a position in which the passage 24 is shut off in a leakproof manner, but a translation motion in the forward direction may be imparted to the flap, while the spring 28 is compressed, when the passage has to be opened.

The radial outward deformation of the end 46 of the flange 38 of the cage 30 implies no rubbing motion of part of said cage on the piston 10, when the jig 50 is guided accurately in relation to the piston 10, which is very simple to achieve. Moreover, an automated control of the jig is quite feasible.

Figure 5:
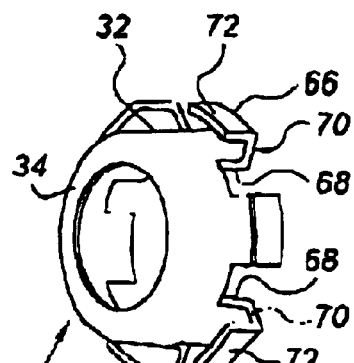
FIG. 5 is a schematic perspective view of a variant of the cage.

As regards the variant illustrated in FIG. 5, the cage 30 comprises a cylindrical or truncated-cone shaped wall 32, the rear end of which exhibits U-shaped lugs 66, a first part 68 of which extends axially rearwards in the prolongation of the wall 32, whereas an intermediate part 70 is bent radially outwards and serves the same purpose as the annular flange 36 according to the embodiment represented in FIG. 2, and the third part 12 of said lugs extending axially forwards and serving the same purpose as the cylindrical flange 38 according to the embodiment represented in FIG. 2. At its front end, the wall 32 is connected to an annular flange 34, in the same way as in the preceding embodiment.

Figure 6:
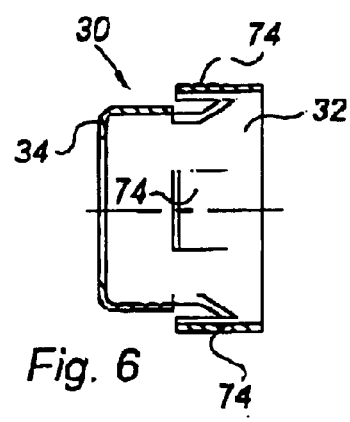
FIG. 6 is a schematic axial sectional view, showing another variant of the cage.

FIG. 6 shows another variant, in which the cage 30 comprises a wall 32, in the shape of a truncated cone at least at its rear part while it may be cylindrical at its front part, and lugs 74 consisting of partial cuts in the rear part of the wall 32, such lugs 74 extending forwards substantially parallel to the axis of the cage from the rear end of the latter, on a length corresponding to that of the cylindrical flange 38 according to the embodiment illustrated in FIG. 2. At its front end, the cage comprises an annular flange 34, which is directed radially inwards in the same way as in the preceding embodiments.

Figure 7:
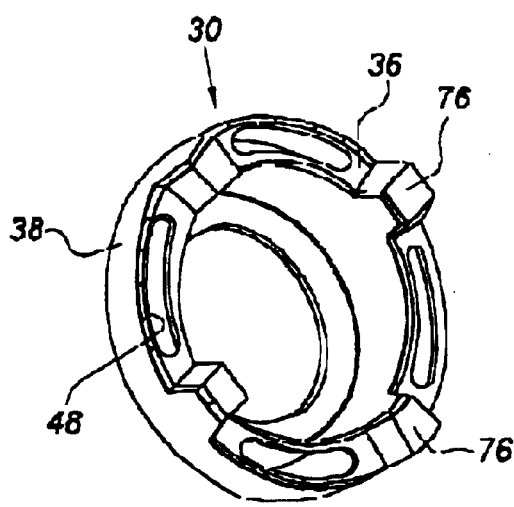
FIGS. 7 and 8 are schematic perspective views of another variant of the cage.
Figure 8:
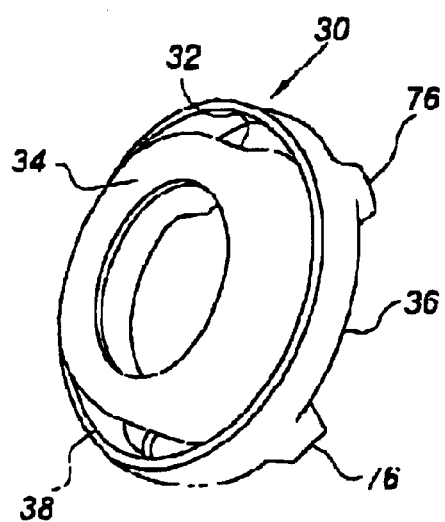

Another variant of the cage, as shown in FIGS. 7 and 8, corresponds fundamentally to the embodiment as per FIG. 2, and it comprises a truncated-cone shaped wall 32, extending between a front annular flange 34 and a rear annular flange 36, including openings 48 and united with a cylindrical flange 38, the rear annular flange 36 further comprising protruding studs 76, which extend axially rearwards and constitute the abutting means of the cage 30 against the inner shoulder 64 of the housing 20.

As far as all these embodiments are concerned, the cage 30 is fastened inside the housing 20 in the above-described manner, in which there is no contact whatsoever either with the inner wall of the housing 20 or the edges and root of the annular groove 44, thus precluding any removal of metal particles or chips.

It should also be noted that, in the embodiments shown in FIG. 5 through 8, the cage 30 does not have to be axially movable inside the housing in order to keep clear, of the end part of such housing, openings facilitating the pressure-fluid flow through the passage 24.

What is claimed is:

1. A master cylinder piston, more particularly for a motor vehicle, comprising at one end a substantially cylindrical housing (20) accommodating a flap (22) and a return spring (28) arranged between the flap and a cage (30), added to the piston, characterised in that said cage (30) is crimped inside the housing (20), characterised in that the crimping process is carried out using retaining means (38, 72, 74), which are formed on the cage and accommodated, under a plastic deformation effect, in an annular groove (44) provided in said housing.

2. The piston according to claim 1, characterised in that the cage (30) is movable inside the housing, on a distance corresponding to the axial play or its retaining means within the annular groove (44).

3. The piston according to claim 1, characterised in that the retaining means comprise a substantially cylindrical flange (38) extending round the cage in the direction of the open end of the housing (20).

4. The piston according to claim 1, characterised in that the retaining means comprise lugs (72, 74), extending substantially parallel to the axis of the cage around the latter in the direction of the open end of the housing (20).

5. The piston according to claim 4, characterised in that said lugs (72, 74) are formed either by partial cuts or cutouts made in a substantially cylindrical or truncated-cone shaped wall (32) of the cage.

6. The piston according to claim 1, characterised in that the cage (30) comprises, on the side of the flap (22), bearing means (36, 76) intended to rest on an inner shoulder (64) of the housing.

7. The piston according to claim 1, characterised in that the end of the cage, on the open end side of the housing (20), comprises an annular flange (34) directed radially inwards and constituting bearing means for the return spring (28) of the flap.

8. The piston according to claim 1, characterised in that said cage is manufactured using a stamping process.

9. A jig for the fitting of a flap into a master cylinder piston, more particularly for a motor vehicle, said piston (10) comprising, at one end, a substantially cylindrical housing (20) accommodating a flap (22) and a return spring (28) arranged between the flap and a cage (30), added to the piston and fastened using retaining means received within an annular groove (44) made in the cylindrical wall of the housing (20), characterised in that:

in an initial free state, said cage (30) has an outer diameter which is smaller that the inner diameter of the housing (20);

the housing (20) includes means (64) for the axial support of the cage (30) in a position in which its retaining means (38, 72, 74) are radially in line with said annular groove (44); and the jig comprises means (52) for the support and application of the cage (30) onto the supporting means (64) of the housing, and means (54) for a radially-outward deformation of said retaining means of said cage, so as to introduce them into the annular groove (44) provided in the housing.

10. The jig according to claim 9, characterised in that the means f or the application of the cage (30) onto the supporting means (64) of the housing comprise a central push rod (52), fitted inside a tubular member (54), a bevelled end (56) of which constitutes said radial-deformation means.

11. The jig according to claim 10, characterised in that the central push rod (52) is guided for an axial sliding motion within said tubular member (54), and biased by a return spring (58) in a direction which corresponds to the applying of the cage (30) onto the supporting means (64), formed in the housing.

* * * * *